Figure 4:
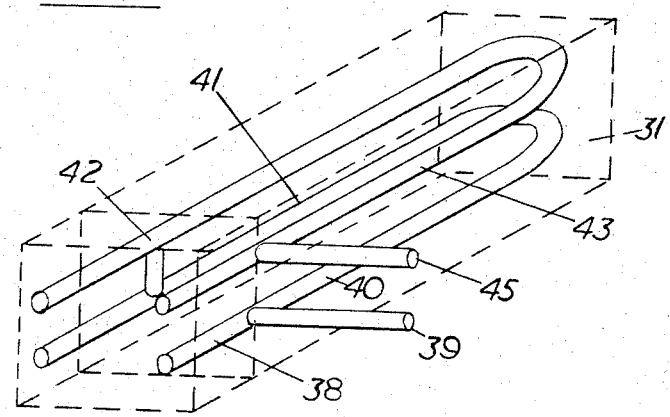

Aug. 22, 1967
C. R. TAYLOR
3,337,322
METHOD OF MANUFACTURE OF FLAT GLASS WITH REDUCING ATMOSPHERE
Filed Oct. 17, 1963
3 Sheets-Sheet 1
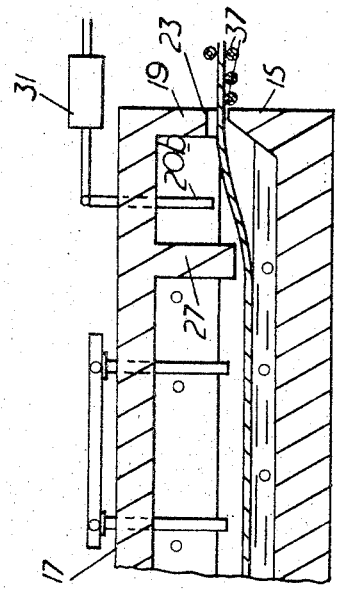
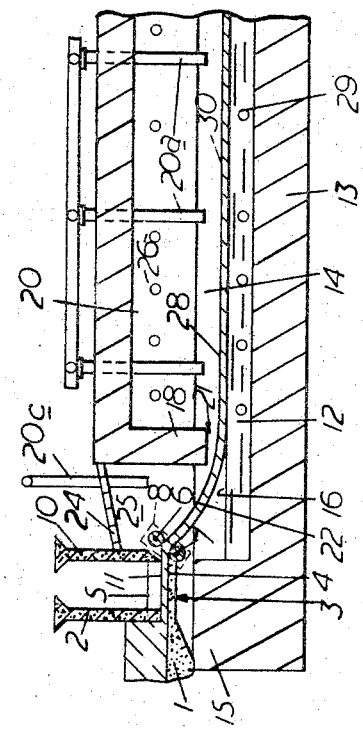
FIG.1
Charles Ronald Taylor
Inventor
By Morrison, Kennedy & Campbell
Attorneys

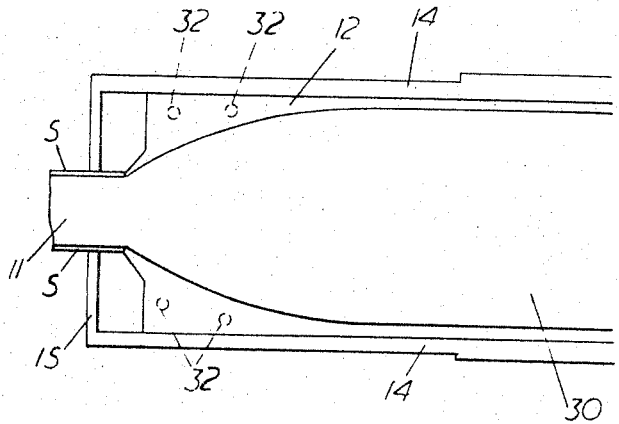
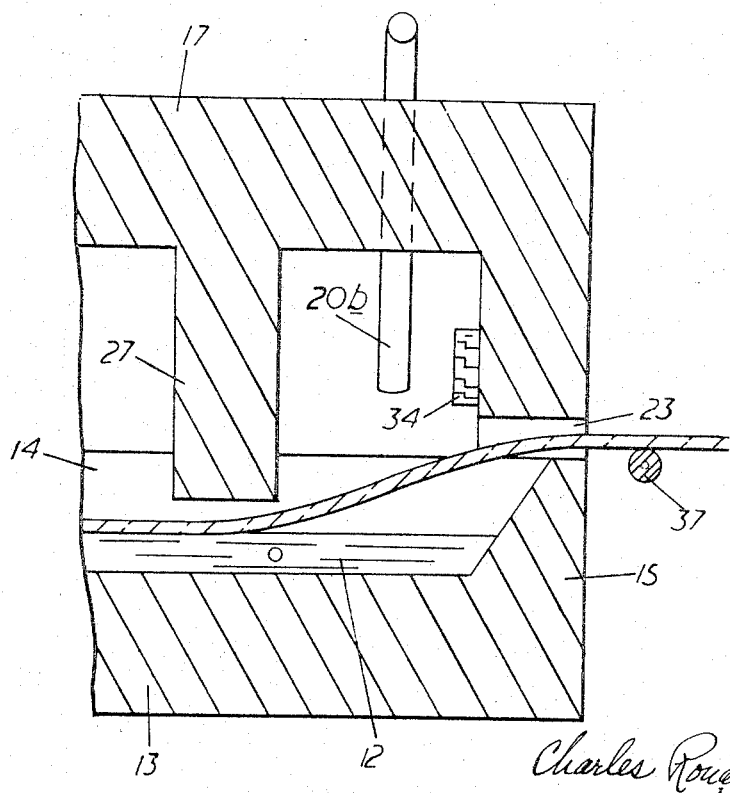

Aug. 22, 1967

C. R. TAYLOR 3,337,322

METHOD OF MANUFACTURE OF FLAT GLASS
WITH REDUCING ATMOSPHERE

Filed Oct. 17, 1963

3 Sheets-Sheet 3

Charles Ronald Taylor
Inventor

Morrison, Kennedy & Campbell
By
Attorneys

United States Patent Office 3,337,322
Patented Aug. 22, 1967

3,337,322
METHOD OF MANUFACTURE OF FLAT GLASS WITH REDUCING ATMOSPHERE
Charles Ronald Taylor, St. Helens, England, assignor to Pilkington Brothers Limited, Liverpool, England, a corporation of Great Britain
Filed Oct. 17, 1963, Ser. No. 316,853
5 Claims. (Cl. 65—32)

This invention relates to the manufacture of flat glass.

In the manufacture of flat glass in which glass is in contact with a molten metal, for example a method in which flat glass is manufactured in ribbon form on a bath of molten metal, for example molten tin or tin alloy in which tin predominates, in order to protect the molten metal a plenum of protective atmosphere is maintained over it. The molten metal with which the glass is in contact is such as to have all the characteristics as fully described in U.S.A. Patent No. 2,911,759 for the molten bath.

The protective atmosphere employed over the molten metal is constituted by a non-oxidising gas, and must be a gas which will not chemically react to any substantial extent with the molten metal to produce contaminants of the glass.

However, even when a plenum of protective atmosphere is maintained over the molten metal, the exposed surface of the bath may be subjected to contamination through traces of oxygen which find their way into the atmosphere over the molten metal either from the external atmosphere or from the glass on the molten metal via the molten metal itself.

At the temperature of the bath these traces of oxygen in the atmosphere over the molten metal may react with the molten metal at its surface to produce very small quantities of metal oxide. The metal oxide is in general a contaminant for the glass as by reason of volatilisation and re-condensation it may be deposited on the upper surface of the glass.

It is a main object of the present invention to provide an improved method of manufacturing flat glass during which the glass is in contact with molten metal by inhibiting reaction of oxygen at the surface of the molten metal.

Accordingly the present invention provides in the manufacture of flat glass during which the glass is in contact with a molten metal, maintaining over the molten metal a protective atmosphere comprising a major proportion (i.e. more than 50%) of a gas which is inert or substantially inert at the temperature existing above the molten metal, and a proportion of a reducing gas to react with any oxygen present in the atmosphere over the molten metal, and thereby to inhibit reaction at the surface of the molten metal.

The method of the present invention has particular application to the manufacture of flat glass in ribbon form on a bath of molten metal, and it is a particular object of the present invention to provide an improved method of manufacturing flat glass in ribbon form on a bath of molten metal by inhibiting reaction of oxygen at the surface of the bath.

According to one aspect, therefore, the present invention provides in the manufacture of flat glass during which the glass is supported on a bath of molten metal, maintaining in the headspace over the bath a protective atmosphere comprising a major proportion (i.e. more than 50%) of a gas which is inert or substantially inert at the temperature of the headspace over the bath, and a proportion of a reducing gas to react with any oxygen present in the atmosphere over the bath, and thereby to inhibit reaction at the surface of the bath.

The gas which comprises the major proportion of the protective atmosphere is a gas such as nitrogen or argon, which is inert or substantially inert at the temperature of the headspace over the bath; in particular this gas must be inert or substantially inert to the metal of the bath.

According to this aspect, therefore, the present invention further provides, in the manufacture of flat glass during which the glass is supported on a bath of molten tin, maintaining in the headspace over the bath a protective atmosphere comprising a major proportion (i.e. more than 50%) of a gas such as nitrogen or argon which is inert or substantially inert to the tin, and a proportion of a reducing gas such as hydrogen which will react with any oxygen present in the protective atmosphere, thereby inhibiting reaction of the oxygen at the surface of the bath.

Advantageously, the protective atmosphere consists of the two gaseous components only, the major proportion of gas which is inert or substantially inert comprising at least 85% of the protective atmosphere, and the reducing gas comprising the remainder of the protective atmosphere.

Preferably, the gas which is inert or substantially inert comprises at least 90% of the protective atmosphere.

The contaminants for the bath, and primarily the oxygen which it is desired to eliminate from the headspace, will enter at the inlet or the outlet to the bath against the plenum of protective atmosphere, and accordingly it is of primary importance that an adequate proportion of the reducing gas shall be maintained in the regions of the inlet and outlet of the bath.

According to this aspect, therefore, the present invention provides, in the manufacture of flat glass during which the glass is supported on a bath of molten metal, maintaining over the inlet and the outlet of the bath an atmosphere under conditions such that contaminants, e.g. oxygen, in the regions of said inlet and said outlet are reacted, and reaction of said contaminants at the surface of the bath is inhibited.

More particularly, according to this aspect of the invention, reducing conditions are maintained in the region of the outlet from the path by introducing a mixture of gases comprising a major proportion of a gas such as nitrogen or argon which is inert or substantially inert to the metal of the bath, and a proportion of a reducing gas such as hydrogen, the said mixture of gases having been preheated to a temperature at which the reducing gas will react with contaminants, e.g. oxygen, present in the region of the said outlet.

Alternatively, reducing conditions in the region of the outlet are maintained by maintaining a protective atmosphere comprising a major proportion of a gas such as nitrogen or argon which is inert or substantially inert to the metal of the bath and a proportion of a reducing gas such as hydrogen, in the presence of a combination catalyst in the said region, which catalyst is effective to cause the reducing gas to react with oxygen in the atmosphere in said region.

Preferably, the protective atmosphere which is maintained in the region of said outlet consists of a gas which is inert or substantially inert, with an admixture of about 3% to about 10% of a reducing gas.

As regards the region of the inlet to the bath, there is maintained in said region a protective atmosphere consisting of a gas which is inert or substantially inert with an admixture of about 2% to about 8% of a reducing gas.

Desirably, there is maintained in the headspace over the bath between the regions of said inlet and said outlet, a protective atmosphere consisting of a gas which is inert or substantially inert with an admixture of about 0.25% to about 3.0% of a reducing gas.

Advantageously, the reducing gas which is used in the regions of the inlet and the outlet, and in the headspace between the said regions, is hydrogen.

According to a preferred feature, the present invention provides, in the manufacture of flat glass during which the glass is supported on a bath of molten tin, maintaining over the bath in the region of the inlet to the bath a protective atmosphere consisting of a gas such as nitrogen or argon which is inert or substantially inert to the tin at the temperature in said inlet region with an admixture of about 2% to about 8% of hydrogen, maintaining over the bath in the region of the outlet from the bath a protective atmosphere consisting of a gas such as nitrogen or argon, which is inert or substantially inert to the tin, with an admixture of about 3% to about 10% of hydrogen, and maintaining in the headspace over the bath between the said inlet region and said outlet region a protective atmosphere consisting of a gas such as nitrogen or argon which is inert or substantially inert to the tin, with an admixture of about 0.25% to about 3.0% of hydrogen, whereby oxygen present in the said protective atmospheres will react with the hydrogen to form water vapour, thereby inhibiting reaction of the oxygen at the surface of the bath.

Figure 5:
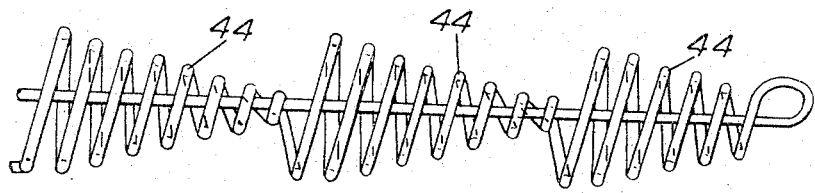

In order that the invention may be more clearly understood, some preferred arrangements in accordance therewith will now be described, by way of example, with reference to the accompanying drawings in which:

FIGURE 1 is a sectional elevation of apparatus according to the invention comprising a tank structure containing a bath of molten metal, a roof structure over the tank structure and apparatus for delivering a rolled ribbon of glass at a controlled rate on to the bath surface, FIGURE 2 is a plan view of the inlet end of a tank structure showing a different arrangement from that of FIGURE 1, FIGURE 3 is a sectional elevation of the outlet end of a tank structure showing a different arrangement from that of FIGURE 1, FIGURE 4 shows diagrammatically a preferred form of heating chamber for use in the apparatus of FIGURE 1, and FIGURE 5 shows a preferred arrangement of a heating coil for the heating chamber.

In the drawings, like reference numerals designate the same or similar parts.

Referring to the drawings and more particularly to FIGURE 1, a forehearth of a continuous glass melting furnace is indicated at 1, a regulating tweel at 2 and a spout at 3. The spout 3 comprises a lip 4 and side jambs 5 which form with the lip a spout of generally rectangular cross-section. A cover is secured over the spout 3 in well-known manner.

Operatively associated with the spout 3 are a pair of water-cooled casting rolls 6 and 7 which are mounted in side frames 8 and are driven through toothed wheels by power means, not shown.

A gate 10 is adjustably supported in a vertical plane in continuity with the upper casting roll 6. The gate 10 shields the roll 6 from heat radiated from the molten glass 11 flowing from the forehearth 1 over the lip 4 of the spout 3 to the pass between the casting rolls 6 and 7.

The upper casting roll 6 is disposed slightly in advance of the lower casting roll 7 so that the molten glass 11 flows from the lip 4 on to the upper part of the roll 7 which thus presents to the glass 11 a downwardly and forwardly directed arcuate casting bed moving in the same direction as the direction of flow of the glass 11 along the spout. Thus the molten glass 11 on leaving the spout 3 is constrained to flow forwardly thereby preventing backward flow of molten glass under the spout 3.

The ribbon forming means comprising casting rolls 6 and 7 just described is disposed over one end of a tank structure which contains a bath 12 of molten metal, for example molten tin or a molten tin alloy in which tin predominates. The tank comprises a floor 13, side walls 14 and end walls 15. The side walls 14 and end walls 15 are integral with each other and with the floor 12. The level of the surface of the bath 12 of molten metal is indicated at 16.

The tank structure supports a roof structure bridging the bath and including a roof 17, end walls 18 and 19, and side walls 20, so that the roof structure provides a tunnel over the bath 12 and defines a head-space over the bath. An outlet 23 is defined by the end wall 19 of the roof structure, and the end wall 15 of the tank structure, and a cooled ribbon of glass is taken unharmed from the bath through the outlet 23.

The roof structure also includes an intermediate wall 27 situated near the outlet end of the bath, so that the headspace over the bath is divided into a main or central headspace between the end wall 18 and the intermediate wall 27, and a similar headspace or chamber between the intermediate wall 27 and the end wall 19. A protective atmosphere maintained at a plenum is fed into the main or central headspace through the ducts 20a which are connected to a header outside the roof structure, the ducts 20a extending downwardly through the roof 17. The protective atmosphere which is fed into the main or central headspace over the bath through the ducts 20a consists of 99.5% of nitrogen and 0.5% of hydrogen.

A protective atmosphere is supplied to the smaller headspace or chamber between the intermediate wall 27 and the end wall 19 of the roof structure by a duct 20b, which extends downwardly through the roof 17. The intermediate wall 27 thus separates from the main headspace over the bath an outlet region in which a protective atmosphere different from that in the main headspace may be maintained. The protective atmosphere fed through the duct 20b consists of 95% nitrogen and 5% hydrogen, and the gases entering through the duct 20b are first passed through the heating chamber 31 in which the gases are pre-heated to about 800° C. Consequently, the protective atmosphere in the outlet region of the structure is at a greater temperature than the temperature of the bath in that region, which is normally about 600° C., so that reaction between the hydrogen in the protective atmosphere introduced through the duct 20b, and any oxygen which may enter through the outlet 23, is promoted and water vapour is formed, the oxygen being thus combined before it can come into contact with the surface 16 of the bath 12.

In general any water vapour formed is carried away in the exhaust through the outlet 23. However, if any water vapour should remain in the atmosphere over the molten tin, the oxygen present is in a combined form and combined oxygen is much less ready to react with the molten tin at the surface 12 of the bath than is uncombined oxygen. However, some reaction of the water vapour with the molten tin to yield tin oxide may occur at the temperature of the outlet end of the bath, the products of the reaction being tin oxide and hydrogen. This reaction is an equilibrium reaction, and the presence of some hydrogen already in the protective atmosphere alters the equilibrium of the reaction to reduce this oxidation of the tin, so that the hydrogen in the protective atmosphere at the outlet end of the bath additionally inhibits the oxidation of the tin by any water vapour which may be present in the atmosphere in that region.

The end wall 18 at the inlet end of the tank extends downwardly into the tank structure, and defines an inlet 21 through which a formed ribbon of glass 22 is delivered by the casting rolls 6 and 7 on to the bath. An extension 24 of the roof is provided and forms, with the gate 10 and the end wall 18 of the roof structure, a chamber enclosing the casting rolls 6 and 7. This chamber further comprises side walls 25 which are carried by the side walls 14 of the tank. A protective atmosphere is fed into this chamber in the inlet region of the bath through the duct 20c, and the protective atmosphere fed through the duct 20c consists of 95% nitrogen and 5% hydrogen.

The temperature at the inlet end of the bath is of the order of 1,000° C., so that if any oxygen should enter the chamber in the inlet region, this will react with the hydrogen in the protective atmosphere, and the oxygen will be combined before it can come into contact with the surface 16 of the bath 12.

Thus, if oxygen enters the chamber in the inlet region, it is present only as water vapour, and at the temperature of the inlet region hydrogen has a greater affinity for oxygen than has the molten tin of the bath so that formation of tin oxide at the surface of the bath is substantially prevented.

As already indicated, the atmosphere in the main headspace over the bath is maintained at a plenum so that there will be a flow of protective atmosphere outwardly through the inlet 21 and beneath the intermediate wall 27. The protective atmosphere in the chambers in the inlet and outlet regions is maintained at a lesser plenum so that there is a further outward flow of protective atmosphere around the casting rolls 6 and 7, and through the outlet 23.

In the embodiment of the invention described herein by way of example, temperature regulators, shown as heaters 26, are mounted in the roof over the bath and further temperature regulators shown as heaters 29 are mounted in the bath. The temperature gradient down the bath is so regulated that the ribbon of glass leaving the bath through the outlet has flat parallel surfaces which have a lustre of a fire finish quality. These characteristics of the glass leaving the bath are achieved either by superficial melting of the surfaces of the glass as it is advanced along the bath or by maintaining the temperature of the bath at the inlet end at at least about 1,000° C., so that a molten layer 28 of glass is formed from the ribbon 22, this layer being maintained molten for a sufficient distance down the bath to permit the development of a buoyant body 30 of molten glass. The buoyant body 30 of molten glass is continually advanced in ribbon form along the bath and is cooled as it is advanced until at the outlet end of the bath where the temperature is about 600° C. the ribbon can be taken unharmed from the bath by driven rollers 37 disposed at the outlet end of the tank and slightly above the level of the bottom of the outlet 23 from the bath.

As an alternative to the introduction of the mixure of gases, that is to say the 95% nitrogen and 5% hydrogen, through the duct 20c shown in FIGURE 1, it is possible for the nitrogen and the hydrogen to be supplied separately. For example the nitrogen may be supplied through the duct 20c and the smaller proportion of hydrogen may enter the headspace over the bath by being bubbled through the molten metal of the bath 12 from inlet passages 32, as shown in FIGURE 2. The introduction of the hydrogen by bubbling through the molten metal of the bath is a feature which forms part of the subject matter claimed in application Ser. No. 316,868 of Alan Edwards filed on the same date as the present application.

FIGURE 2 also shows an alternative method of delivering molten glass to the bath 12 of molten metal, the molten glass being delivered so that it has a free fall of a few inches from the spout 3; the molten glass then flows forwardly on to the bath 12 on which the glass is advanced.

In practice the quantity of hydrogen delivered from the inlet passages 32 will be slightly more than the five parts for every ninety-five parts of nitrogen. This is because the hydrogen which actually enters the headspace in the inlet region will be less than the hydrogen passing into the molten metal of the bath from the inlet passages 32, as some of the hydrogen passing through the molten metal of the bath will react with contaminants, for example oxygen, which may be present in the molten metal of the bath.

Similarly, the hydrogen required in the headspace over the central part of the bath, and also in the chamber in the inlet region of the bath, may also be introduced through the molten metal of the bath if desired.

As an alternative to the preheating of the protective atmosphere introduced into the chamber in the outlet region of the bath, which preheating in the embodiment of FIGURE 1 takes place in the heating chamber 31, there may be included in the outlet chamber a basket 34 containing a combination catalyst, for example of palladium, which causes the hydrogen present in the atmosphere to react with any oxygen entering through the outlet 23 even though the temperature in the outlet chamber is of the order of 600° C. only. In addition to palladium, reference may be made to platinum and other noble metals of Groups VIII and IB of the periodic table.

Referring to FIGURE 4 of the drawings, there is shown diagrammatically a preferred arrangement of pipe 38 in the heating chamber 31. The pipe 38 consists of a four pass system, so that the gas entering through the inlet 39 traverses the sections 40, 41, 42 and 43 of the pipe in sequence before leaving the heating chamber 31 and being conveyed to the duct 20b. The pipe 38 is conveniently a Thermalloy tube having a total length about 15 feet, and the pipe 38 is packed around in the heating chamber 31 by an appropriate insulating material.

A separate heating element is included in each of the sections 40 to 43 of the pipe 38. Advantageously the heating elements in the different sections of the pipe have different powers and are arranged in order of descending power in the sections 40 to 43. The form of the heating element is shown in FIGURE 5 of the drawings, and each heating element comprises a series of spiral sections 44 so that thermal contact with all parts of the stream of passing gas is achieved. The heating elements advantageously comprise the essential inner conducting material surrounded by high purity magnesium oxide as insulant, the whole being sheathed in stainless steel.

Using the heating chamber and heating elements described with reference to FIGURES 4 and 5, it was found that an exit temperature of 800° C. for the gas leaving the heating chamber 31 through the outlet 45 could be conveniently and economically maintained.

By the use of the embodiments of the invention described with protective atmospheres in the chambers in the inlet and outlet regions of the bath, the ingress of uncombined oxygen into the headspace over the bath from the external atmosphere is substantially prevented. However, as already indicated, some uncombined oxygen may enter the headspace over the bath from the glass on the bath, and the smaller range of hydrogen content in the main central headspace over the bath is maintained in order to prevent the atmosphere in the headspace becoming an oxidising atmosphere as a result of oxygen entering the headspace from the molten glass on the bath.

If desired, the nitrogen forming the main component of the protective atmosphere may be replaced by a suitable inert gas, and argon and helium are two possible alternatives to nitrogen as the major component of the protective atmosphere.

Glass produced by the method according to the present invention has all the advantages of a fire finish quality and freedom from distortions such as occur in the known rolling or drawing methods.

This invention comprehends flat glass produced by the method according to the invention, and sheet glass cut therefrom.

In this specification all gas percentages are percentages by volume.

I claim:

1. In a method of manufacturing flat glass during which glass is advanced in ribbon form along a bath of molten metal and is cooled as it is advanced until it is sufficiently stiffened to be discharged through an outlet from the bath, maintaining a protective atmosphere consisting of an inert gas with an admixture of about 0.25% to about 3% of reducing gas at a plenum over the bath, and maintaining over the region of the outlet from the bath a different protective atmosphere consising of an inert gas with an admixture of about 3% to about 10% of reducing gas.

2. A method according to claim 1, including maintaining over the bath in the region of the inlet for glass to the bath a protective atmosphere consisting of an inert gas with an admixture of about 2% to about 8% of a reducing gas.

3. A method according to claim 1, wherein the reducing gas in said different protective atmosphere is hydrogen, and before introducing that atmosphere into the region of the outlet from the bath it is preheated to a temperature at which hydrogen reacts with contaminants, e.g., oxygen, present in the region of the outlet.

4. A method according to claim 1, wherein said different protective atmosphere is introduced into the outlet region in the presence of a combination catalyst in that region, which catalyst is effective to cause the reducing gas to react with any oxygen present in the atmosphere in the outlet region.

5. In the manufacture of flat glass during which glass in ribbon form is advanced along a bath of molten metal and is discharged from the bath through an outlet from the bath, maintaining reducing conditions in the region of the outlet from the bath by maintaining a protective atmosphere comprising a major proportion of a gas selected from the group consisting of nitrogen and argon and a proportion of hydrogen, in the presence of a palladium catalyst in the said region, which catalyst is effective to cause the reducing gas to react with oxygen in the atmosphere in said region.

References Cited
UNITED STATES PATENTS 3,241,937    3/1966    Michalik et al. _____ 65—65

DONALL H. SYLVESTER, *Primary Examiner.*

S. LEON BASHORE, *Examiner.*

A. D. KELLOGG, *Assistant Examiner.*